United States Patent [19]
Schmidt

[11] Patent Number: 5,904,070
[45] Date of Patent: May 18, 1999

[54] APPARATUS FOR ATTENUATING THE SWINGING AND SLIDING MOTIONS OF MOTOR VEHICLE PARTS

[75] Inventor: Reinhard Schmidt, Lennestadt, Germany

[73] Assignee: R. Schmidt GmbH, Lennestadt, Germany

[21] Appl. No.: 08/797,159

[22] Filed: Feb. 10, 1997

[30] Foreign Application Priority Data

Feb. 10, 1996 [DE] Germany .......................... 196 04 940

[51] Int. Cl.⁶ ....................................................... F16C 1/10
[52] U.S. Cl. ........................ 74/500.5; 74/502.5; 188/65.1
[58] Field of Search .......................... 74/500.5, 501.5 R, 74/501.5 H, 502.5; 188/290, 306, 65.1

[56] References Cited

U.S. PATENT DOCUMENTS 4,018,102 4/1977 Faiks ....................................... 74/500.5

FOREIGN PATENT DOCUMENTS

| | | | |
|---|---|---|---|
| 2516619 | 5/1983 | France ................................... | 188/306 |
| 3021533 | 12/1981 | Germany ............................... | 74/502.5 |
| 3931866 | 3/1991 | Germany . | |
| 4035231 | 5/1992 | Germany ............................... | 74/500.5 |
| 4207757 | 9/1992 | Germany . | |
| 4233037 | 4/1994 | Germany . | |
| 288712 | 12/1987 | Japan .................................... | 74/500.5 |
| 5149320 | 6/1993 | Japan .................................... | 74/500.5 |
| 93/22570 | 11/1993 | WIPO ................................... | 74/500.5 |

*Primary Examiner*—John A. Jeffery
*Assistant Examiner*—Mary Ann Battista
*Attorney, Agent, or Firm*—Herbert Dubno

[57] ABSTRACT

In order to make an apparatus for attenuating the pivotal or sliding movement of motor-vehicle parts which is formed of a first part fixed on the nonsliding or nonpivoting part and a second part mounted on the pivotal or slidable part which is extremely inexpensive and which takes up minimal space it is suggested that one of the two elements be formed by a tubular and stiff or flexible tube which is filled with a viscous mass and that the other part being formed by a core which slides in the tubular body so that relative pivoting or sliding of the parts coaxially slides the core relative to the tubular body.

9 Claims, 3 Drawing Sheets

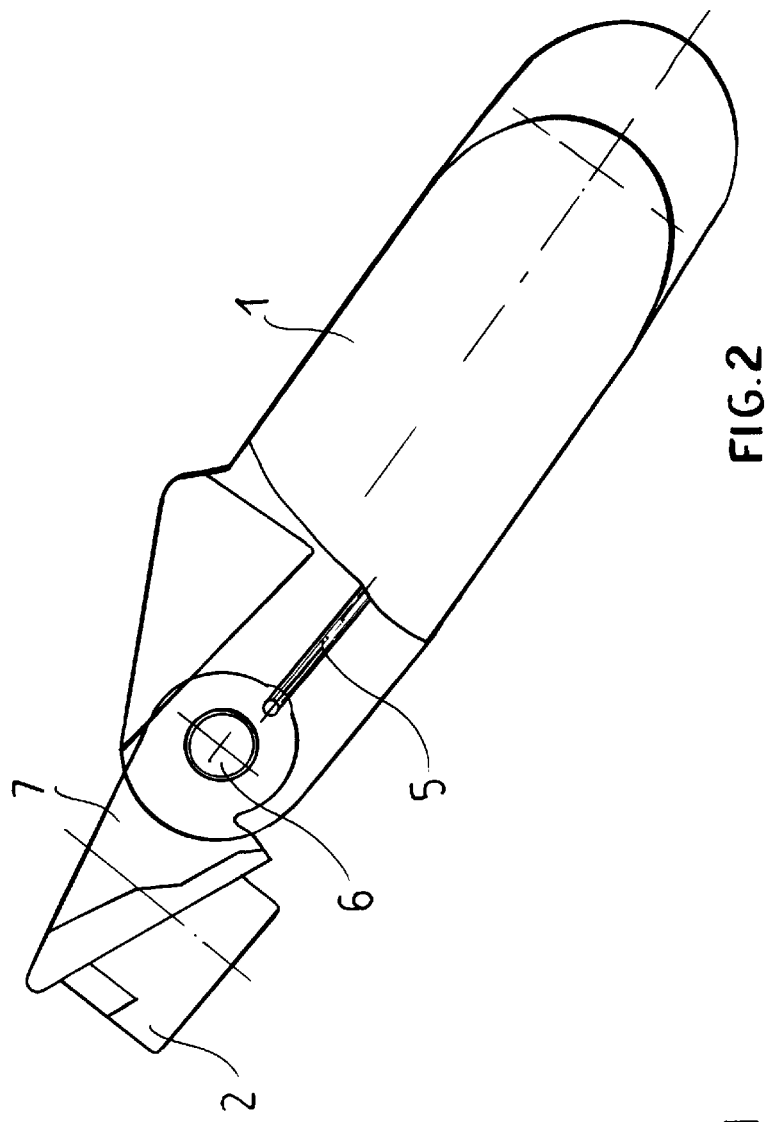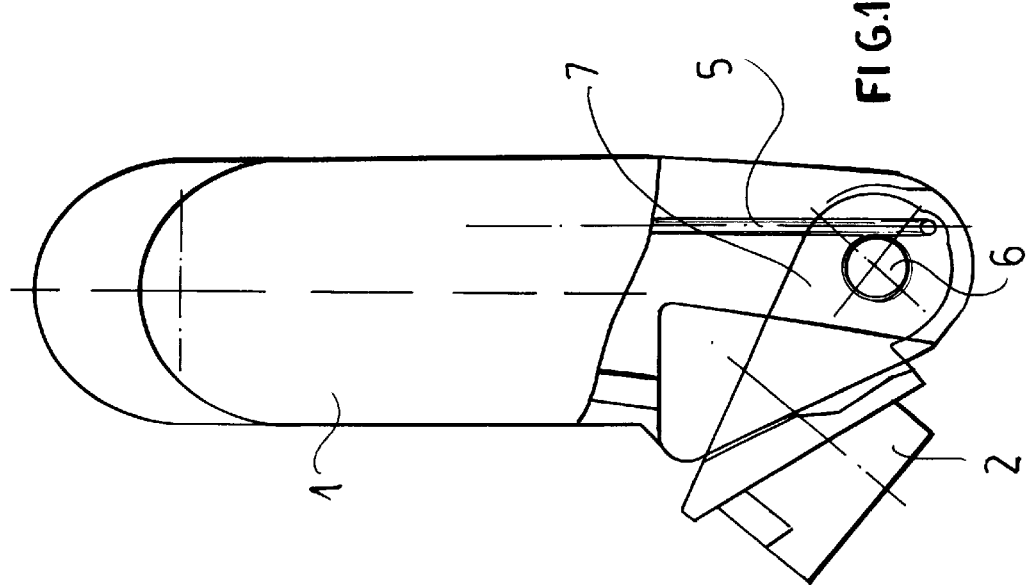

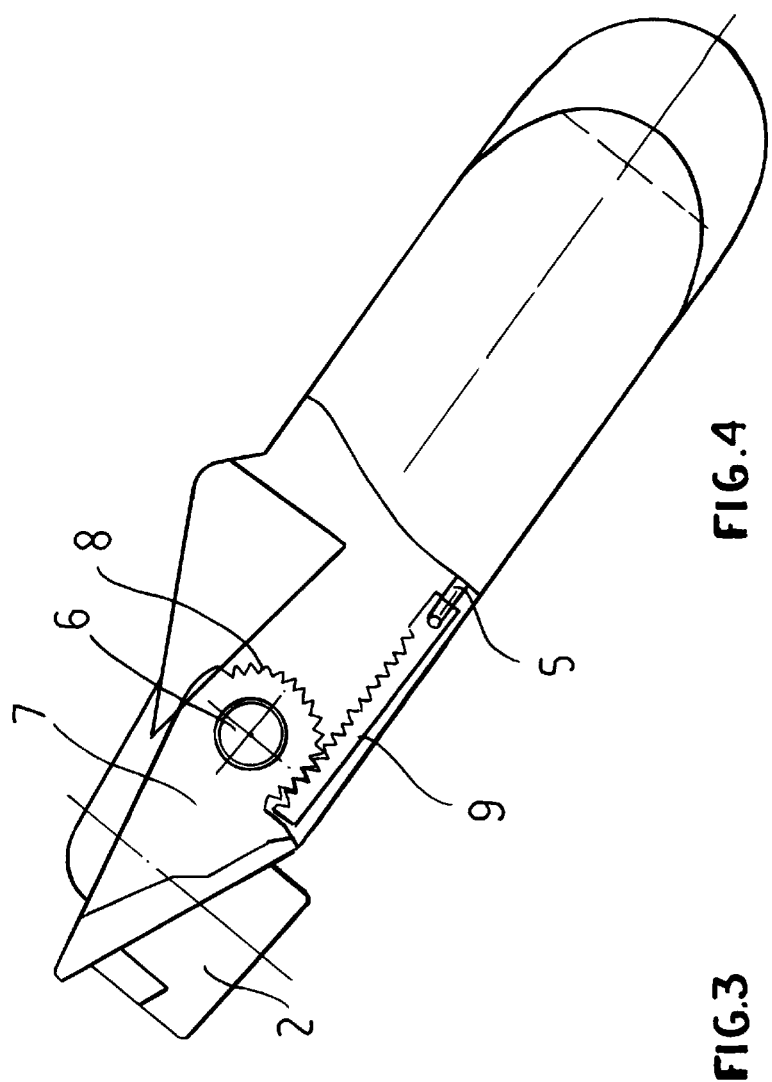

APPARATUS FOR ATTENUATING THE SWINGING AND SLIDING MOTIONS OF MOTOR VEHICLE PARTS

FIELD OF THE INVENTION

The invention relates to an apparatus for attenuating the swinging and sliding movements of motor-vehicle parts, in particular parts like handles that swing out or in under spring force or flaps that swing out or in under spring force or drawer-like parts that swing or slide in or out under spring force, the apparatus having a first part fixed to the non-swinging or nonsliding part and a second element mounted on the swingable or slidable part.

BACKGROUND OF THE INVENTION

German 4,218,445 shows a device which comprises an operational part of a motor vehicle, for example an ash tray, a cover for a glove compartment, a drink holder or the like. The device has a frame part fixed in a recess of a motor vehicle and a part, e.g. a flap, an ash tray, or a drink holder, provided thereon. On one of the two parts, preferably on the frame part, there is a viscobrake which comprises a housing part filled with a viscous mass or fluid, a brake element rotatable in the mass or liquid, and a gear connected thereto via a shaft. Holddown fingers are formed on the housing part. The housing part is set in a corresponding recess of the respective parts, preferably the body part, and is held in place by the holddown fingers. On other of the parts, preferably on the flap or on the slidable element, there is a rack or segment gear meshing with the gear so that the meshing parts effect an attenuation of the sliding or pivotal movement. Preferably the pivotal flap or the sliding element is moved against the force of a spring into a closed position and can be latched there so that when released the spring slides or pivots it into the open position. Pivotal handles are also known in motor vehicles which are normally secured on the sun roof of the vehicle. With these pivotal handles there is between the attachment element and the actual handle a spring that urges the handle back into the swung-in position lying against the roof. The handle is manually swung out against the spring force. When the handle is released from the swung-out position, it jumps back under partial unloading of the spring into the rest position, making an annoying banging noise.

In order to reduce this effect it is known to provide such elements with brakes as described above. Such brakes require additional installation space outside the actual handle or the like. The brakes are relatively expensive and bulky.

OBJECT OF THE INVENTION

It is an object of the invention, starting from this state of the art, to provide an device of this type that is extremely inexpensive to manufacture and that takes up very little space.

SPECIFIC DESCRIPTION

This problem is solved according to the invention in that one of the two parts is formed by a stiff or flexible tubular body which is filled with a viscous mass and the other of the two parts is formed by a core which slides in the tubular body so that relative swinging or sliding of the parts coaxially shifts the core relative to the tubular body.

With this construction, swinging-out or sliding-out of an element relatively shifts the core and the tubular body so that this shifting movement is braked by the viscous mass filling the annular space between the tubular body and the core. If necessary the core is provided with a roughened outer surface so that the braking effect of the viscous mass is improved. The core can be a stiff or even flexible element so long as the core does not bend when subjected to normal compression and tension loads. The two elements in the respective parts can arranged in very little space, it only being necessary to mount the tubular straight or even bent body in the appropriate cavity of the respective part and to connect the end of the core with the other corresponding element of the two relatively movable parts. When the swinging or pivoting is spring loaded in one direction or the other, the relative movement of the core inside the tubular body filled with the viscous mass brakes the relatively sliding or moving parts. The two elements are extremely inexpensive to manufacture so that such a brake can be mounted inexpensively in many parts.

In order to avoid extrusion of the viscous mass out of the tubular body on relative shifting of the core in the tubular body, an internal stripping edge or seal is preferably provided at least on the end of the tubular body from which the core can be drawn or from which the core extends.

A cavity can be provided along the tubular body or at its end at which the core extends from the tubular body which serves as a reservoir for the viscous mass or liquid.

It is in some applications preferred that the tubular body is of metal.

Alternatively it is possible that the tubular body is of plastic.

In addition it is preferably provided that the core is made of metal and preferably is a metallic cable.

In particular it is also preferably suggested that the viscous mass be a soft silicone.

In some circumstances it is also provided that the tubular body is formed by a passage in one of the two parts and is integral with the part.

BRIEF DESCRIPTION OF THE DRAWING

The above and other objects, features, and advantages will become more readily apparent from the following description, reference being made to the accompanying drawing in which:

FIGS. 1 and 2 are elevational views of a first embodiment of a pivotal handle in the rest and swung-out positions;

FIGS. 3 and 4 show a second embodiment in the same views;

SPECIFIC DESCRIPTION

Figure 5:
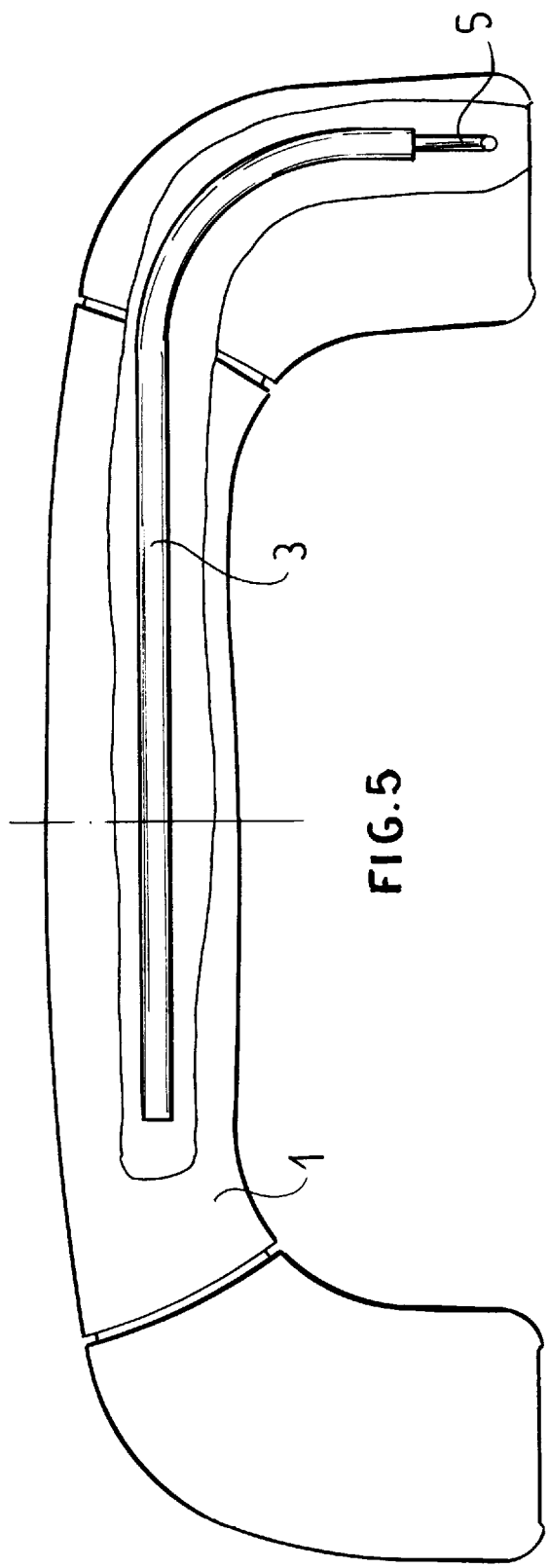
FIG. 5 is a view of a detail, partly in section.

The drawing shows a handle 1 which can for example be mounted on the sun roof of a motor vehicle. Pivoting the handle 1 out of the rest position of FIGS. 1 and 3 into the operational position of FIGS. 2 and 4 is done against the force of an unillustrated spring that is increasingly loaded on pivoting out of the handle 1. The handle can thus, as soon as it is released by the user, be swung automatically by the spring back into the rest position of FIGS. 1 and 3. In order to avoid that this produces a noise as the handle engages the roof, the handle 1 is integrated with a brake that is shown in particular in FIGS. 5 and 6. The brake comprises a first element fixed on the nonsliding or nonpivoting part and a second element fixed on the slidably or pivotally mounted part. According to the invention one of the elements is formed by an elongated tubular and either stiff or flexible body 3 that is filled with a viscous mass 4. The other of the two elements is formed by a core 5 which is slipped into the tubular body 3. The core projects at one end out of the tubular body 3 while the other end of the tubular body 3 is open so that a vacuum cannot form inside the tubular body 3. The viscous mass fills the annular space between the core 5 and the tubular body 3. If necessary a seal or stripping edge can be provided at the end where the core 5 extends out of the tubular body in order to inhibit loss of the viscous mass. The tubular body 3 can be made of metal but is preferably plastic. The core 5 can for example be a metallic braid or metallic cable but can also be made of plastic, an outer surface of the core being roughened. The viscous mass 4 is preferably flowable silicone.

As is visible in FIGS. 1 and 2 the core 5 is eccentrically attached to a bearing surface of the element 2, the eccentricity being relative to the pivot joint or axis 6 of the handle 1. Pivoting of the handle 1 from the position of FIG. 1 into the position of FIG. 2 slides the core increasingly into the tubular element 3. When the handle 1 is moved by the return spring from the position of FIG. 2 into position 1 the core 5 slides out of the tubular body 3 with the viscous mass braking its movement.

In the embodiment according to FIGS. 3 and 4 the journal block 7 of the element is formed with teeth 8 that mesh with a rack 9 that is fixed on the end of the core 5. Swinging of the handle 1 out of the position of FIG. 3 into the position of FIG. 4 forces the rack 9 to slide along with the core 5 into the tubular element 3. When the handle is then released to position 4, it returns under the force of the spring again into the position of FIG. 3 with this movement being braked between the core 5 and the tubular element 3.

Figure 6:
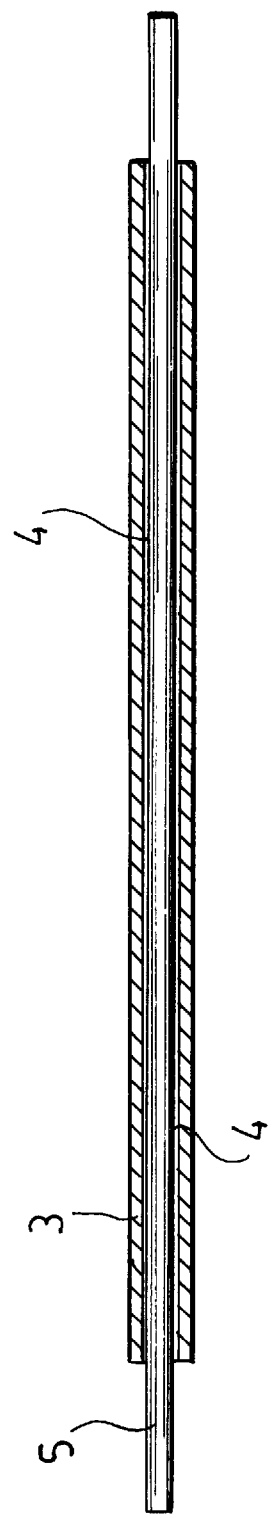
FIG. 6 is a view of a detail, partly in section.

As is particularly visible in FIG. 5 the elements 3 and 5 can be simply integrated into the existing handle, whether the handle is formed of one piece or as in FIG. 5 of several pieces. The body of the handle 1 can be hollow as a result of the gas pressure in an injection-molding operation. A gas-vent hole is thus formed in the handle in which the tubular element 3 and also the core 5 can be slipped. With appropriate bending, even multiple bends, the damping action of the tubular element 3 can be increased as well as by changing the diameters of the relatively slidable elements 3 and 5.

Although the embodiments only show use in a handle, it is also possible to mount the brake element in another element of a motor vehicle.

The invention is not limited to the illustrated embodiments but can be varied within the scope of the disclosure.

All new individual or combination features disclosed in the drawing and/or in the description are seen as essential to the invention.

I claim:

1. An apparatus for attenuating swinging and sliding movements comprising a movable motor-vehicle part and a stationary part, an elongated rectilinear tube filled with a viscous liquid and connected to one of said parts, and a core which slides in the tube so that relative swinging or sliding of the parts coaxially shifts the core relative to the tube, said tube having an inner surface in direct contact with said liquid and said core having an outer surface in direct contact with said liquid, said tube and said liquid frictionally retarding displacement of said core in said tube.

2. The apparatus according to claim 1 wherein said core extends from one end of said tube and the end of the tube opposite the end from which the core extends is open.

3. The apparatus according to claim 1 wherein the tube is composed of metal.

4. The apparatus according to claim 1 wherein the tube is composed of plastic.

5. The apparatus according to claim 1 wherein the core is made of metal.

6. The apparatus defined in claim 5 wherein said core is a metallic cable.

7. The apparatus according to claim 1 wherein the core is made of plastic.

8. The apparatus according to claim 1 wherein the viscous liquid is a silicone.

9. The apparatus according to claim 1 wherein the tube is formed by a passage in one of the two parts and is integral therewith.

* * * * *